United States Patent [19]

Miller et al.

[11] 4,159,834
[45] Jul. 3, 1979

[54] PASSIVE LAP AND SHOULDER BELT SYSTEM

[75] Inventors: Larry D. Miller, Warren; Laird E. Johnston, Birmingham; John T. Valus, Troy; Thomas M. Powell, Rochester, all of Mich.

[73] Assignee: General Motors Corporation, Detroit, Mich.

[21] Appl. No.: 899,717

[22] Filed: Apr. 25, 1978

[51] Int. Cl.² .................................................. B60R 21/02
[52] U.S. Cl. ......................................................... 280/802
[58] Field of Search ............... 280/745, 753, 744, 747; 297/388, 389; 180/82 R

[56] References Cited

U.S. PATENT DOCUMENTS

| | | | |
|---|---|---|---|
| 3,794,135 | 2/1974 | Ewert et al. | 280/745 |
| 3,901,550 | 8/1975 | Hamy | 280/753 |
| 4,004,829 | 1/1977 | Kato et al. | 280/745 |
| 4,053,175 | 10/1977 | Kato et al. | 280/745 |

*Primary Examiner*—Robert R. Song
*Attorney, Agent, or Firm*—Charles E. Leahy

[57] ABSTRACT

A passive three-point lap and shoulder belt system has the outboard ends of the lap and shoulder belts mounted on the vehicle body door respectively adjacent the hip and shoulder of the occupant. A retractor mounted on the body generally adjacent the inboard hip of the occupant winds a control belt which is connected with the lap and shoulder belts at the juncture of their inboard ends to establish the lap and shoulder belts in their occupant restraining positions when the door is closed. A door mounted belt stiffener is encased within the lap belt and includes a plurality of stacked abutting elements normally hingedly movable relative one another to allow the lap belt to fall limp across the occupant lap. The elements are connected by one or more tension cables which are tensioned upon opening movement of the door to compress and erect the abutting elements into a stiff column which lifts the lap belt as well as the shoulder and control belts further upwardly and forwardly of their respective stowed positions normally obtained by the swing geometry of the open door. Mechanism for tensioning the tension cables includes a door mounted pulley or like rotary member having the tension cables attached at a point eccentric from the axis of rotation. A control cable is wound upon the pulley and attached to the door hinge pillar of the body so that opening movement of the door rotates the pulley in the direction to tension the tension cables.

5 Claims, 5 Drawing Figures

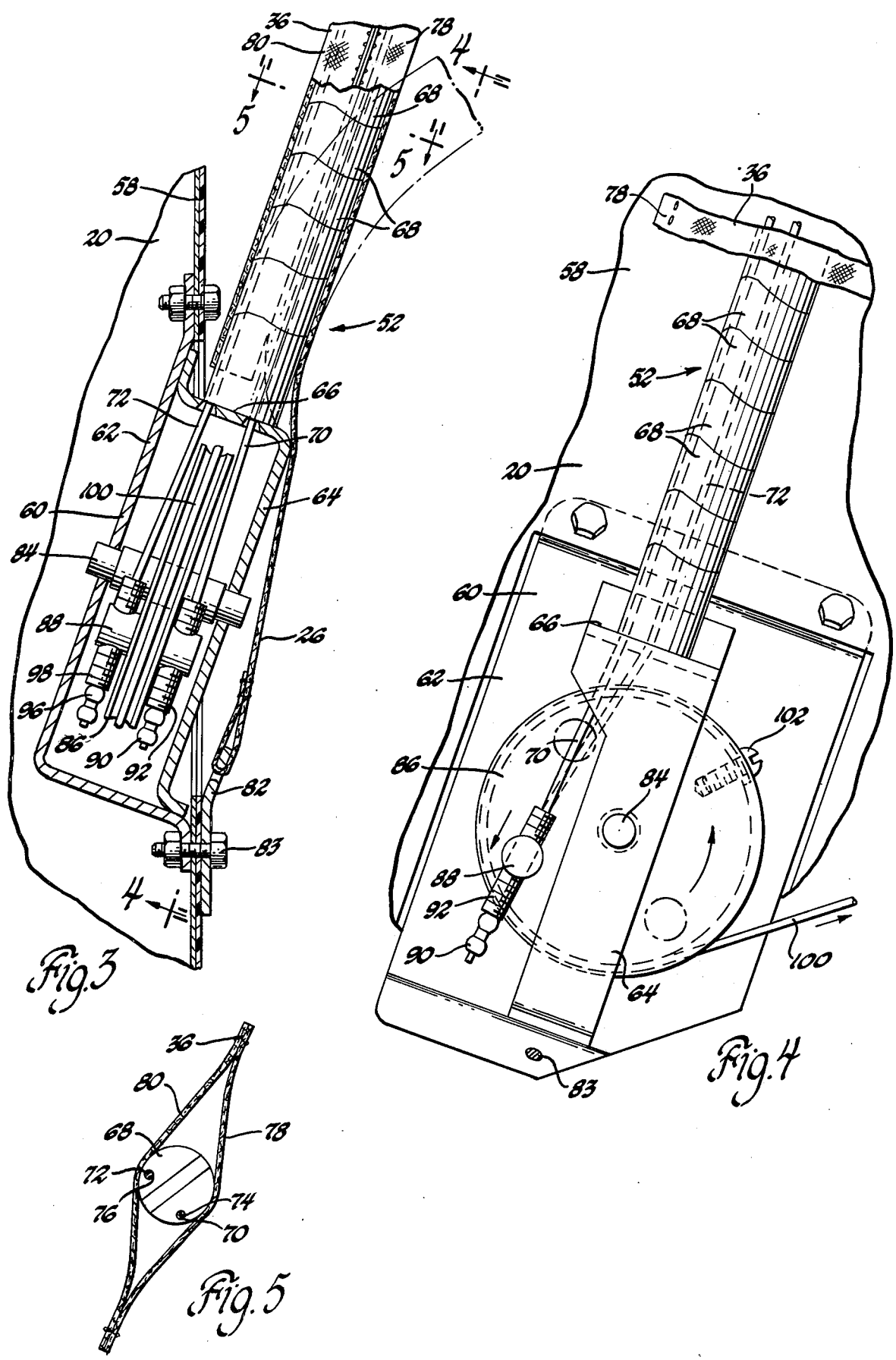

4,159,834

PASSIVE LAP AND SHOULDER BELT SYSTEM

The invention relates to a three-point passive occupant restraining belt system and more particularly to an improved means for lifting the lap and shoulder belts upwardly and forwardly away from the occupant when the door is opened.

BACKGROUND OF THE INVENTION

It is well known in motor vehicles to restrain an occupant in the seat by a lap belt disposed across the lap and a shoulder belt disposed diagonally across the chest. It is also known to connect the outboard belt ends to the door so that the swing geometry of the door automatically moves the belts between a restraining position about the occupant and a stowed position forwardly of the seat in response to movement of the door between open and closed positions.

It has been recognized as desirable to move the outboard lap belt end further forwardly and/or upwardly upon opening of the door to facilitate occupant ingress or egress. Keppel et al U.S. Pat. No. 3,680,883, issued Aug. 1, 1972, and assigned to the assignee of this invention, provides a track on the door having a guide loop traveling therein to move the outboard lap belt end forwardly and upwardly upon opening of the door. Kato et al U.S. Pat. No. 4,004,829, issued Jan. 25, 1977 provides a spring steel strip which is fed into a door mounted lap belt upon opening movement of the door to stiffen the lap belt along the door panel. Ewert et al U.S. Pat. No. 3,794,135, issued Feb. 26, 1974 and assigned to the assignee of this invention provides an articulated seat belt positioner comprised of a series of hingedly connected segments articulated by the tensioning of a spring strip passing through apertures of the segment members upon movement of the door.

SUMMARY OF THE INVENTION

The present invention provides a new and improved lap and shoulder belt system wherein a door mounted belt stiffening mechanism encased within the lap belt is operable by door movement to move both the lap belt and shoulder belt upwardly and forwardly to a stowed occupant access position upon opening movement of the door.

According to the invention, a passive three-point lap and shoulder belt system has the outboard ends of the lap and shoulder belts mounted on the vehicle body door respectively adjacent the hip and shoulder of the occupant. A retractor mounted on the body generally adjacent the inboard hip of the occupant winds a control belt which is connected with the lap and shoulder belts at the juncture of their inboard ends to establish the lap and shoulder belts in their occupant restraining positions when the door is closed. A door mounted belt stiffener is encased within the lap belt and includes a plurality of stacked abutting elements which are normally hingedly movable relative one another to allow the lap belt to fall limp across the occupant lap. One or more tension cables extend through the elements and are attached to the terminal-most element to compress the abutting elements into engagement with one another when the cables are tensioned and thereby erect a rigid column. A belt stiffener is mounted on the door at an angle which causes the rigid column to lift the lap belt as well as the shoulder and control belts further upwardly and forwardly than their respective stowed positions normally obtained by the swing geometry of the open door. A mechanism for tensioning the tension cables includes a door mounted pulley or like rotary member having the tension cables attached at a point eccentric from the axis of rotation. A control cable is wound upon the pulley and attached to the door hinge pillar of the body so that opening movement of the door rotates the pulley in the direction to tension the tension cables and closing movement relaxes the tension cable so that the lap belt falls limp across the occupant lap.

The object, feature and advantage of the invention resides in the provision of a door mounted passive three-point lap and shoulder belt system wherein a belt stiffening mechanism encased within the lap belt includes a plurality of abutting elements hingedly movable relative one another to allow the lap belt to fall limp and having a tension cable extending therethrough to compress the elements into an erect rigid column which lifts the lap and shoulder belts forwardly and upwardly away from the occupant when the door is opened.

A further object, feature and advantage of the invention resides in the provision of a door mounted belt stiffening mechanism including a plurality of hingedly abutting elements having a cable extending therethrough and attached to a door mounted rotary member which is rotated by opening movement of the door to tension the cable and erect the abutting elements into a rigid column which stiffens the belt at a desired angle of inclination relative the door.

BRIEF DESCRIPTION OF THE DRAWINGS

These and other objects, features and advantages of the invention will become apparent upon consideration of the specification and the appended drawings in which:

FIG. 3 is an elevational view of the door mounted lap belt stiffening mechanism having parts broken away and in section;

FIG. 4 is a sectional view taken in the direction of arrows 4—4 of FIG. 3; and

FIG. 5 is a sectional view taken in the direction of arrows 5—5 of FIG. 3.

DETAILED DESCRIPTION OF THE PREFERRED EMBODIMENT

Figure 1:
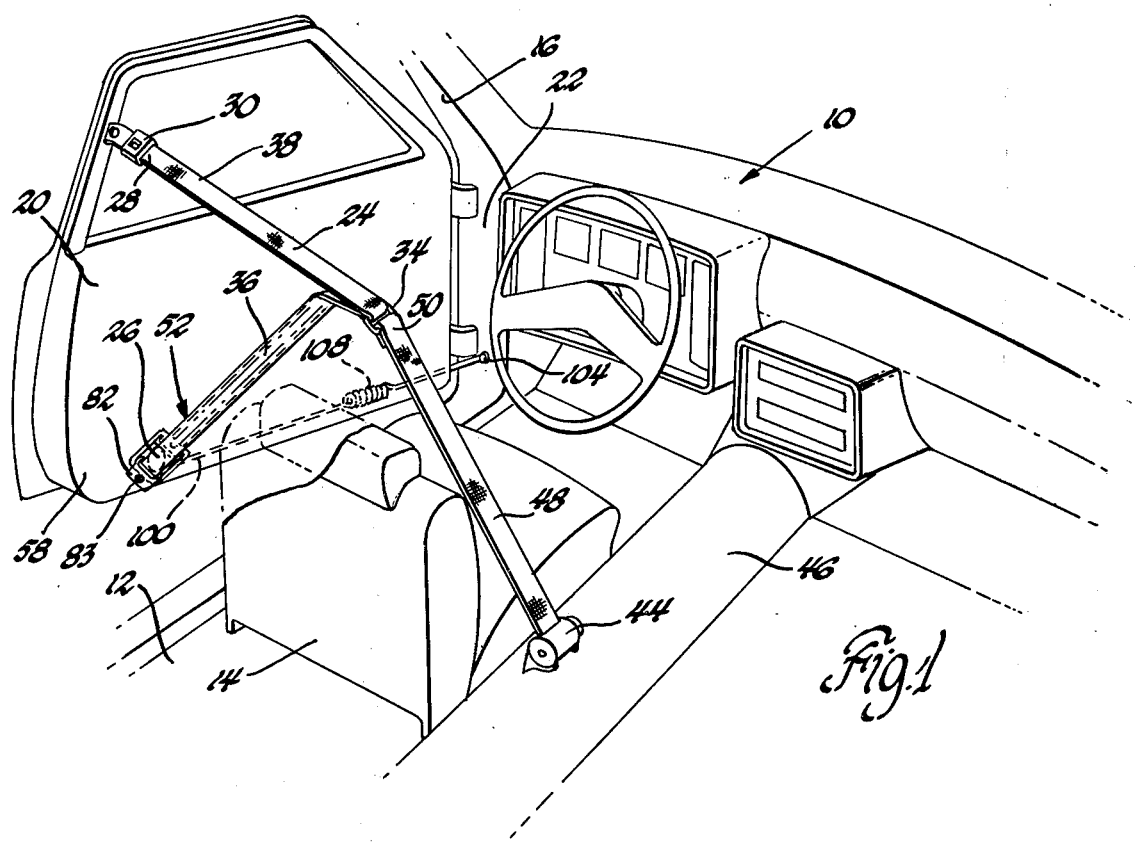
FIG. 1 is a perspective view of a motor vehicle occupant compartment having a belt arrangement according to the invention with the lap and shoulder belts stowed in the occupant access position.

Referring to FIG. 1, the vehicle body generally indicated at 10 defines a passenger compartment 12 in which an occupant seat 14 is mounted. The vehicle body has a door opening 16 which is selectively closed by a door 20 which has its forward end hingedly connected to the vehicle body hinge pillar 22.

As seen in FIG. 1, an occupant restraint belt arrangement includes a continuous loop of belt 24 having a lower end 26 attached to the lower rear corner of the door generally adjacent the outboard hip of the seated occupant and an upper end 28 attached to the window frame of door 20 adjacent the occupant shoulder. The connection of the upper end 28 is preferably provided by a conventional buckle assembly 30.

A slip ring 34 is slidable on the belt 24 and divides the belt 24 into a lap belt 36 and a shoulder belt 38. A conventional seat belt retractor 44 is mounted on the drive line tunnel 46 and winds a control belt 48 having its outboard end 50 attached to the slip ring 34. Accordingly, winding of the control belt 48 by the retractor 44 when the door 20 is closed retracts the slip ring 34 to a position generally adjacent the inboard hip of the seated occupant to dispose the lap belt 36 across the lap of the occupant and dispose the shoulder belt 38 diagonally across the chest of the seated occupant. The retractor 44 may be of any suitable prior art retractor and is preferably of the vehicle sensitive inertia locking type.

When the door 20 is in the open position as shown in FIG. 1, the swing geometry of the door 20 moves the outboard ends of the lap and shoulder belts 36 and 38 outwardly and forwardly and unwinds the control belt 48 to dispose the lap and shoulder belts generally forward of the seat to facilitate occupant ingress and egress. A lap belt stiffening mechanism, generally indicated at 52, is encased within the lap belt 36 as will be described hereinafter. The lap belt stiffening mechanism 52 stiffens the lap belt 36 in a position extending generally more forwardly and more closely adjacent the door 20 than would otherwise result by virtue of the swing geometry of the door. Thus the lap belt 36, shoulder belt 38, and the control belt 48 are stowed further upwardly and forwardly away from the occupant to facilitate occupant ingress and egress.

Figure 2:
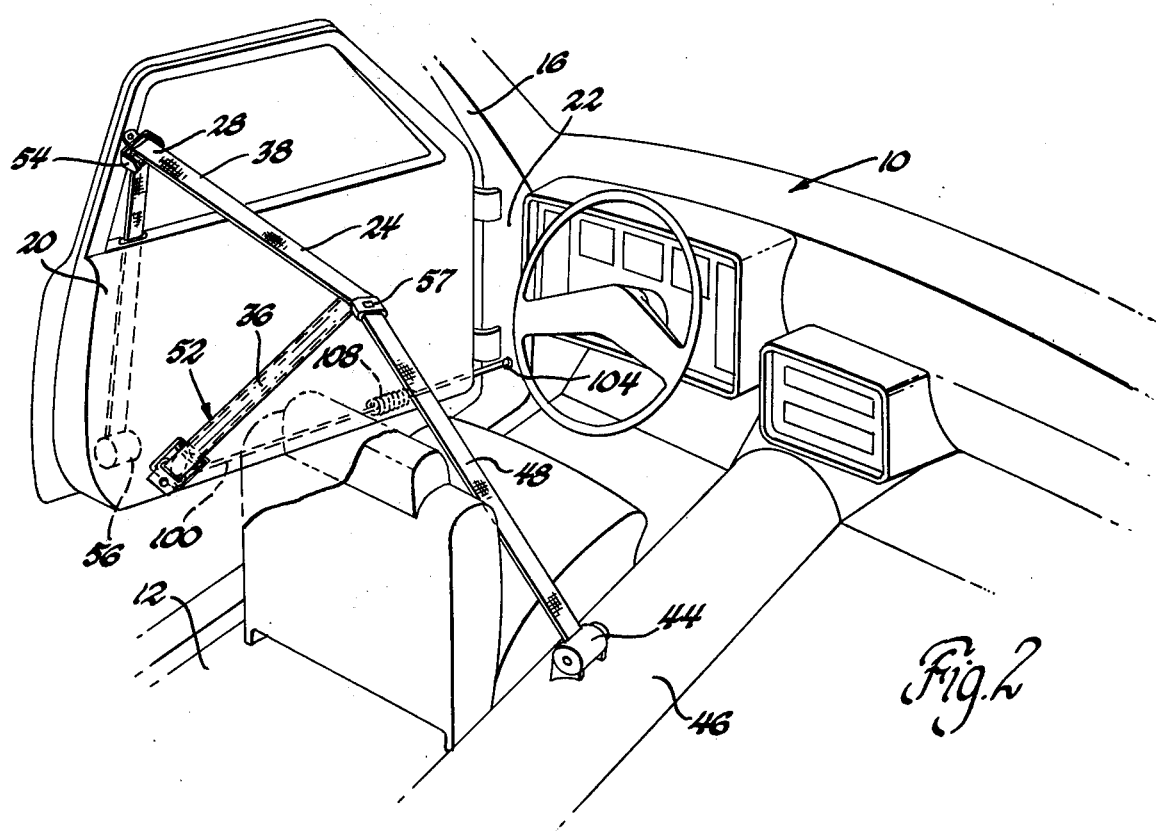
FIG. 2 is a vehicle similar to FIG. 1 and showing another seat belt system embodying the invention.

Referring to FIG. 2, there is shown another seat belt system in which the door mounted lap belt stiffening mechanism 52 may be employed. In this seat belt system the upper end 28 of the belt 24 extends slidably through an anchor loop or roller assembly 54 attached to the window frame of door 20. The belt 24 proceeds downwardly to a door mounted retractor 56 which winds and unwinds the shoulder belt 38 to facilitate forward leaning movement of the occupant and to adjust the length of the shoulder belt 38 to the size of the particular occupant. The belt system of FIG. 2 has the inboard ends of the lap belt 36 and shoulder belt 38 connected to the control belt 48 by a conventional buckle assembly 57.

Referring to FIGS. 3 and 4, it is seen that the door mounted seat belt stiffening mechanism 52 is mounted on the inner panel 58 of the door 20 by a housing 60 comprised of laterally spaced walls 62 and 64 and an upwardly facing angularly inclined wall 66. As best seen in FIGS. 3 and 4, a plurality of cylindrical elements 68 are stacked end-to-end with the bottom element seated upon the inclined wall 66 of housing 60. The elements 68 are maintained in an ordered stack by a pair of tension cables 70 and 72 which extend respectively through apertures 74 and 76 provided in each of the elements 68. The cables 70 and 72 are suitably attached to the upper terminal-most of the elements 68. Each of the elements 68 also has a V-shaped recess at one end and a V-shaped projection at the other end adapted to mate respectively with the projection and recess of the preceding and succeeding elements in a manner which prevents the elements from rotating relative one another.

As best seen in FIGS. 3 and 5, the elements 68 are concealed within the lap belt 36. More particularly, the lap belt 36 includes a load carrying strap 78 on the one side of the stack of elements 68 and a cover strap 80 which overlies the stack of elements 68 and has its edges sewn to the load strap 78. The strap 78 is attached to the door panel 58 by an anchor plate 82 and bolt 83.

When the cables 70 and 72 are tensioned, the elements 68 are compressed into abutting engagement with one another to erect a stiff column which establishes the lap belt 36 a direction normal to the angularly inclined wall 66 of the housing 60. When the tension in the cables 70 and 72 is relaxed, the elements 68 are hingedly movable relative one anoher to allow the lap belt 36 to fall limp.

A mechanism is provided for tensioning the cables 70 and 72 in response to movement of the door 20. Referring to FIGS. 3 and 4, a reel shaft 84 extends between the spaced walls 62 and 64 of housing 60 and rotatably mounts a pulley 86. The pulley 86 journals an axle 88 thereon which is eccentric to the shaft 84 for rotation thereabout upon rotary movement of the pulley 86. As best seen in FIG. 3, the cable 70 has a knob 90 swaged on the end thereof and engageable with the end of a tubular adjusting sleeve 92. The outer surface of the adjusting sleeve 92 is threadedly received in a threaded bore of the axle 88 so that the adjusting sleeve 92 may be rotated to adjust the tension in the cable 70. The other cable 72 is similarly attached to the axle 88 on the opposite face of the pulley 86 by a knob 96 and an adjusting sleeve 98.

A door operated control cable 100 is wrapped around the pulley 86 and has its end attached thereto by a screw 102. The forward end 104 of the control cable 100 extends through the leading wall of the door 20 and is suitably attached to the hinge pillar 22. A conventional coil compression spring 108 is interposed in the cable 100 to prevent overloading of the control cable 100 or the tension cables 70 and 72. In operation, movement of the door from the closed position to the open position of FIG. 1 unwinds cable 100 from the pulley 86 and rotates the pulley 86 in the counterclockwise direction of rotation as viewed in FIG. 4 to move the axle 88 further from the inclined wall 66 of housing 60 and thereby tension the cables 70 and 72.

The phantom-line indicated positions of axle 88 shown in FIG. 4 represents rotation of the pulley through a range of 180° of rotation to move the belt between the limp and stiffened conditions.

Tensioning of the cables 70 and 72 compresses the abutting elements 68 into engagement with one another and thereby erects the elements 68 into a rigid column which lifts the lap belt 36 as well as the shoulder belt 38 and control belt 48 upwardly and forwardly away from the occupant to a greater extent than would result from the swing geometry of the door acting alone.

Upon closing movement of the door, the tension on the cables 70 and 72 is relaxed by clockwise rotation of the pulley 86 and rewinding of the control cable 100 thereon as the door approaches the pillar 22. Relaxation of the tension in the cables 70 and 72 allows the elements 68 to hinge relative one another so that the lap belt falls limp onto the lap of the occupant as the door closes and control belt 48 is wound upon the retractor 44.

It will be understood that although the belt stiffening mechanism of this invention is particularly suited for use in conjunction with the door mounted lap belt of a passive seat belt system, the stiffening mechanism may have application to other seat belt arrangements. For example, a seat belt stiffening mechanism may be employed at the inboard end of a lap or shoulder belt in a passive belt system where the retractor for the belt is mounted on the door.

Furthermore, it will be understood that the cylindrical elements 68 may have their abutment faces angled relative one another in a manner which would dispose the stiffened belt along a curvilinear path if such were desirable to achieve a particular stowed position of the belt system.

The embodiments of the invention in which an exclusive property or privilege is claimed are defined as follows:

1. In combination with a vehicle body having a door movable between open and closed positions laterally adjacent a seat mounted in the occupant compartment of the vehicle body, a passive belt arrangement for restraining a seated occupant comprising:

a shoulder belt mounted on the door generally adjacent the shoulder of the occupant and having an inboard end;

a lap belt having an outboard end mounted on the door generally adjacent the hip of the occupant and having an inboard end;

a control belt connected to the inboard ends of the lap and shoulder belts;

a seat belt retractor mounted on the vehicle body generally adjacent the inboard hip of the occupant for winding the control belt to establish the inboard lap and shoulder belt ends adjacent the hip of the occupant so that the lap belt is disposed across the lap of the occupant and the shoulder belt is disposed diagonally across the chest of the occupant;

a segmented belt stiffener encased within the lap belt and comprising a plurality of serially stacked elements hingedly abutting one another to normally allow the lap belt to fall limp across the lap of the occupant and having a cable extending therethrough to stiffen the elements into an erect rigid column to lift the lap belt to an inclined vertical position adjacent the door panel when the cable is pulled taut;

and means for tensioning the cable when the door is open whereby the lap belt is lifted away from the lap of the occupant when the door is opened.

2. In combination with a vehicle body having a door movable between open and closed positions laterally adjacent a seat mounted within an occupant compartment of the vehicle body, a passive belt arrangement for restraining a seated occupant comprising:

a pair of restraint belt anchorages provided respectively at the upper and lower rear corners of the door;

a continuous length of restraint belt having one end attached to the upper anchorage and one end attached to the lower anchorage;

a slip ring slidably engaging the continuous length of belt to define a shoulder belt portion adapted for diagonal placement across the chest of the occupant and a lap belt portion adapted for placement across the lap of the occupant;

a control belt having an outboard end attached to the slip ring and an inboard end;

a control belt retractor mounted on the vehicle body inboard the seat for winding the control belt to establish the slip ring adjacent the hip of the occupant and dispose the lap and shoulder belt portions in their respective restraining positions;

and a segmented belt stiffener encased within the lap belt and comprising a plurality of serially arranged elements having a cable extending therethrough to stiffen the lap belt in an inclined position adjacent the door when the cable is tensioned;

and means for tensioning the cable when the door is opened and relaxing the cable when the door is closed;

said stiffening of the lap belt cooperating with the swing geometry of the door to establish the lap belt, shoulder belt, and the control belt in a stowed position generally forward and above the occupant seat.

3. In combination with a vehicle body having a door movable between open and closed positions laterally adjacent a seat mounted in the occupant compartment of the vehicle body, a passive belt arrangement for restraining a seated occupant comprising:

a shoulder belt mounted on the door generally adjacent the shoulder of the occupant and having an inboard end;

a lap belt having an outboard end mounted on the door generally adjacent the hip of the occupant and having an inboard end;

a control belt connected to the inboard ends of the lap and shoulder belts;

a seat belt retractor mounted on the vehicle body generally adjacent the inboard hip of the occupant for winding the control belt to establish the inboard lap and shoulder belt ends adjacent the hip of the occupant so that the lap belt is disposed across the lap of the occupant and the shoulder belt is disposed diagonally across the chest of the occupant;

a segmented belt stiffener encased within the lap belt and comprising a plurality of serially stacked elements hingedly abutting one another to normally allow the lap belt to fall limp across the lap of the occupant;

a cable means extending through the elements and attached to the terminal-most element to compress the elements into an erect rigid column to lift the lap belt to an inclined stowed position adjacent the door when the cable is tensioned;

a rotary member having the cable means attached thereto;

and a second cable having one end attached to the rotary member and the other end mounted on the vehicle body so that movement of the door to the open position effects rotation of the rotary member to tension the cable means and movement of the door to the closed position relaxes the cable means.

4. In combination with a vehicle body having a door movable between open and closed positions laterally adjacent a seat mounted in the occupant compartment of vehicle body, a passive belt arrangement for restraining a seated occupant comprising:

a restraint belt having one end achored on the vehicle door for movement between an occupant restraining position when the door is closed and a stowed position when the door is opened;

a plurality of abutting elements stacked end-to-end within the belt;

cable means connecting the plurality of elements in a stiffened predetermined shape when the cable is tensioned to establish the belt in the stowed position and permitting hinged movement of the elements relative one another when the cable is slackened to relax the belt for close fitting restraint about the occupant;

and means responsive to opening movement of the door to tension the cable and responsive to closing movement of the door to relax the cable.

5. In combination with a vehicle body having a door movable between open and closed positions laterally adjacent a seat mounted in the occupant compartment of the vehicle body, a passive belt arrangement for restraining a seated occupant comprising:
a restraint belt mounted on the door for movement between an occupant restraining position when the door is closed and a stowed position when the door is opened;
a plurality of abutting elements serially arranged within the belt and normally hingedly movable relative one another to allow flexure of the belt;
cable means extending through the elements and attached to the terminal-most element to compress the abutting elements into an erect rigid column when the cable means is tensioned so that the belt is supported against flexure and lifted to the stowed position;
a rotary member having the cable means attached thereo;
and a second cable having one end attached to the rotary member and the other end mounted on the vehicle body so that movement of the door between open and closed positions effects rotation of the rotary member to tension and slacken the cable means and thereby effect movement of the belt between the stowed and restraining positions.

* * * * *